G. A. KEMPER.
FISHING TOOL FOR OIL OR OTHER WELLS.
APPLICATION FILED JAN. 25, 1911.
1,000,817.
Patented Aug. 15, 1911.
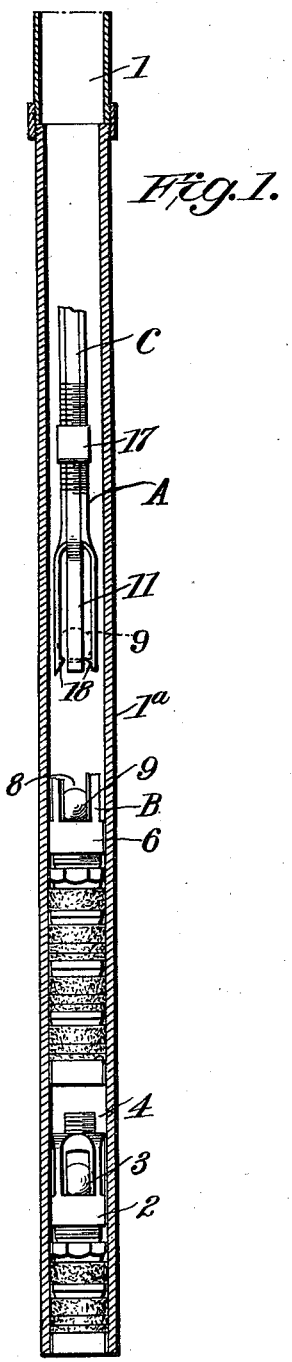
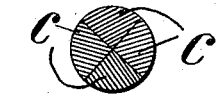
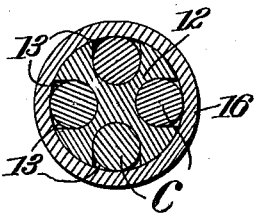
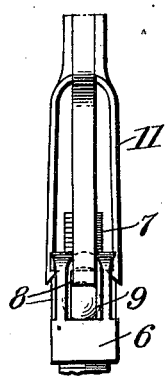
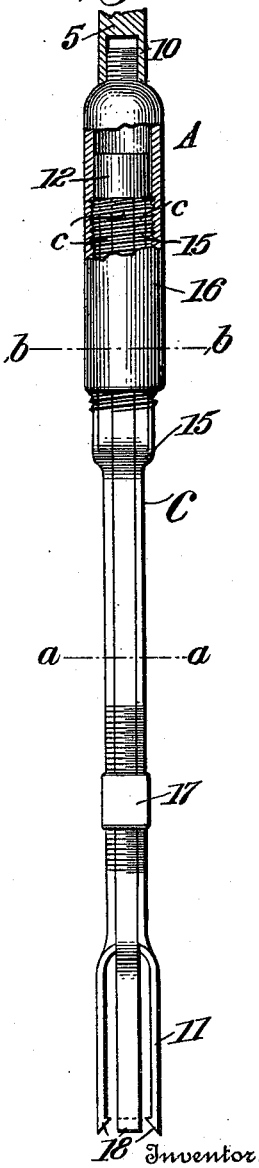
Witnesses
Inventor,
George A. Kemper,
By
Attorney
COLUMBIA PLANOGRAPH CO., WASHINGTON, D. C.

UNITED STATES PATENT OFFICE.

GEORGE A. KEMPER, OF NEWBERNE, WEST VIRGINIA, ASSIGNOR OF ONE-EIGHTH TO SAMUEL J. W. ERWIN, OF NEWBERNE, WEST VIRGINIA.

FISHING-TOOL FOR OIL OR OTHER WELLS.

1,000,817. Specification of Letters Patent. Patented Aug. 15, 1911.

Application filed January 25, 1911. Serial No. 604,688.

*To all whom it may concern:*

Be it known that I, GEORGE A. KEMPER, a citizen of the United States, residing at Newberne, in the county of Gilmer and State of West Virginia, have invented certain new and useful Improvements in Fishing-Tools for Oil or other Wells, of which the following is a specification.

This invention relates to fishing tools for oil or other wells.

One object is to provide a tool of the nature stated embodying such characteristics that it will positively and efficiently serve the function of extracting detached or broken sucker rods, operating and foot valves, cages and similar parts of oil or other well operating apparatus.

Another object resides in the provision of a simple, inexpensive, durable and efficient tool designed for the purpose of extracting broken parts of oil or other well operating apparatus without the necessity of removing the tubular casing of the well.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is an elevation of the tool showing the foot valve or cage and the operating valve of the sucker rod in elevation, the operating valve being broken and the tubing being shown in vertical section. Fig. 2 is an elevation of my improved fishing tool detached from the sucker rod. Fig. 3 is a fragmentary elevation illustrating the fishing tool engaging an operating valve or cage in order to lift it out of the well. Fig. 4 is a transverse sectional view on the line *a—a* of Fig. 2. Fig. 5 is a transverse sectional view on the line *b—b* of Fig. 2.

Referring now more particularly to the accompanying drawings, the reference character 1 indicates a well tubing of ordinary construction and of any length, and 1ª is the barrel at the bottom of which latter and interiorly thereof, is disposed a foot valve or cage 2 of common construction having the usual ball valve 3 and screw threaded boss 4, although, in the use of my improved tool, to be hereinafter more specifically described, the screw threaded boss 4, may or may not be an essential part of the foot valve or cage.

The character 5 indicates a sucker rod, to which the operating valve 6 is usually connected, there being a screw threaded boss 7 on the operating valve 6 which has detachable screw threaded engagement with the sucker rod 5. This operating valve 6, as commonly constructed, has its wall provided with four openings, 8, more or less, and carries a ball valve 9. Sometimes the operating valve 6 becomes detached from the sucker rod 5, in which event, the tubing 1 is sometimes removed from the well in order to reach and extract the detached operating valve. In the use of my invention, however, it is not necessary to remove the tubing 1 in the event that the operating valve 6 becomes detached from the sucker rod, for it is only necessary to screw the boss 10 of my improved tool indicated generally, by the reference character A, to the sucker rod 5 and let the tool down into the tubing 1 until the spring fingers 11 of the tool A engage in said openings 8, when the detached operating valve may be readily withdrawn from the tubing without removing the latter from the well. There are preferably as many fingers as openings in the casings or cages. In the event that the operating valve 6 should become broken as indicated at B in Fig. 1, the same operation of the tool will effect a removal of the ball valve 9 by reason of the spring fingers 11 embracing the ball.

The same operation that is followed to remove a detached or broken operating valve from the tubing is followed in removing other valves of similar type or the common type of cages, as will be well understood, the uppermost unbroken valves in the tubing, of course, being first removed, so that access may be had to the lower broken valve or cage.

The tool A is preferably composed of a stock portion 12 which is provided with a plurality of grooves 13 leading from one end thereof. Fitting in these grooves 13 are the inner ends of spring arms C, said inner ends of said arms being preferably cylindrical in cross-section, as indicated particularly in Fig. 5, and exteriorly screw-threaded as shown, so as to coincide with the threads 15 of the stock 12. The threads of the stock and the threads at the inner ends of the arms are preferably formed by a single operation so that they may be true to properly receive the interior screw threads of the sleeve 16 which telescopes with the stock and overlaps the arms to secure the latter firmly in their sockets formed by the aforesaid grooves. In the event of breakage of one arm, it is apparent that a new arm may be readily substituted because by unscrewing the sleeve 16 and removing it from the stock the arms are easily removed from the grooves. The sleeve 16 carries a screw threaded boss 10 by which it may be readily secured to or detached from the lower end of the sucker rod 5.

Between the spring fingers 11 of the tool and the circular inner ends of the arms C, the arms tend to spring normally outward and are of a peculiar formation in that they take the shape of quadrants of circles in cross-section, as indicated particularly in Fig. 4, so as to obviate spaces between the sides of the arms at their outer edges and to provide a cylindrical exterior surface which is screw threaded for the accommodation of the interiorly screw threaded sleeve 17, which may or may not be a split sleeve, and which works upon the screw-threaded portion of the arms between the fingers 11 and the circular portions of the arms for the purpose of giving the arms more or less tension as may be desired, so as to provide for such positive engagement of the hooks 18 of the fingers with the balls of the valves or with the valve casings or cages as will insure extraction or removal of said parts.

The tool is equally applicable for grabbing a sucker-rod or broken part thereof to provide for its extraction without removing the tubing from the well, and if desired, the arms may be of the same form in cross-section throughout their length, from the inner ends of the fingers to the inner ends of the arms. The inner cylindrical ends of the arms C are preferably of such size in cross-section that when the stock 12 is not between them they may be placed together so that the tension ring 17 may be slipped over them to embrace that portion of the tool that is in the form of quadrants of circles.

It will thus be seen that I provide an efficient tool which, when let down into the barrel, will positively grasp the sucker-rod, the valve casing or cage, or the ball if the top of the casing or cage be broken, and enable the same to be brought to the surface without removing the tubing from the well.

What I claim is:—

1. A tool of the character described comprising a stock, separate arms whose inner ends engage the stock, means for binding the arms to the stock, the outer ends of the arms having spaced, hooked yieldable fingers, and means operatively connected to the arms between said fingers and said stock to force the arms between the fingers and stock together to form a substantially stiff shank and to tension the fingers, the outer ends of the fingers being beveled to facilitate outward spreading thereof.

2. A tool of the character described comprising a stock, separate arms whose inner ends engage the stock, means for securing the inner ends of the arms to the stock, the outer ends of the arms being deflected and formed into yieldable fingers, and means for binding the arms together intermediate their ends to form a substantially stiff, rigid shank portion.

3. A tool of the character described comprising a stock portion provided with a plurality of longitudinal grooves, a plurality of spring arms whose inner ends fit in said grooves, the stock and the inner ends of the arms being screw threaded, an interiorly screw threaded sleeve having working fit with the screw threads of the stock and the arms, said arms having hooked, yieldable fingers at their outer ends, the portions of the arms between the fingers and circular portions being in the form of quadrants of circles in cross section with their curved surfaces screw threaded, and an interiorly screw threaded sleeve having working fit with the last mentioned screw threads to bind those portions of the arms that are in the form of quadrants of circles in cross section together to provide a substantially rigid shank intermediate the fingers and the stock and to provide for tensioning the fingers, the first mentioned sleeve being closed at its outer end and provided with a boss.

In testimony whereof I affix my signature in presence of two witnesses.

GEORGE A. KEMPER.

Witnesses:
 JOHN H. SIGGERS,
 ISAAC M. FOX.

Copies of this patent may be obtained for five cents each, by addressing the "Commissioner of Patents, Washington, D. C."